(12) United States Patent
Smith et al.

(10) Patent No.: US 8,256,706 B1
(45) Date of Patent: Sep. 4, 2012

(54) INTEGRATED HYPERSONIC INLET DESIGN

(75) Inventors: Thomas R. Smith, Westminster, CA (US); Kevin G. Bowcutt, Aliso Viejo, CA (US)

(73) Assignee: The Boeing Company, Chicago, IL (US)

( * ) Notice: Subject to any disclaimer, the term of this patent is extended or adjusted under 35 U.S.C. 154(b) by 697 days.

(21) Appl. No.: 12/575,643

(22) Filed: Oct. 8, 2009

(51) Int. Cl.
*B64D 33/02* (2006.01)
(52) U.S. Cl. ....... 244/53 B; 244/73 R; 244/36; 137/15.1
(58) Field of Classification Search ................ 244/53 B, 244/73 R, 36, 136, 62; 137/15.1, 15.2
See application file for complete search history.

(56) References Cited

U.S. PATENT DOCUMENTS

| | | | | |
|---|---|---|---|---|
| 1,818,257 A | * | 8/1931 | Irgens | 440/88 R |
| 5,082,206 A | * | 1/1992 | Kutschenreuter et al. | 244/53 B |
| 6,138,950 A | * | 10/2000 | Wainfan et al. | 244/53 B |
| 6,634,594 B1 | * | 10/2003 | Bowcutt | 244/35 A |
| 7,721,989 B2 | * | 5/2010 | Dyer et al. | 244/53 B |
| 7,866,599 B2 | * | 1/2011 | Elvin | 244/53 B |
| 2007/0187550 A1 | * | 8/2007 | Elvin | 244/36 |
| 2010/0025542 A1 | * | 2/2010 | Dyer et al. | 244/53 B |

* cited by examiner

*Primary Examiner* — Christopher P Ellis
(74) *Attorney, Agent, or Firm* — Toler Law Group

(57) ABSTRACT

Methods, aircraft, and engine nacelles are disclosed. A wing leading edge of a planform is superimposed on a wing shockwave that extends in a first direction from a shockwave apex toward the wing leading edge. A waverider shape is streamline traced between the wing leading edge and a trailing edge of the planform to form a waverider wing. A position of an engine inlet vertex relative to the waverider wing is identified. An inlet shockwave is projected from the inlet vertex in a second direction generally opposed to the first direction. The inlet shockwave intersects the wing shockwave. An inlet leading edge of an engine inlet includes a lower leading edge including a plurality of points where the inlet shockwave intersects the wing shockwave.

20 Claims, 15 Drawing Sheets

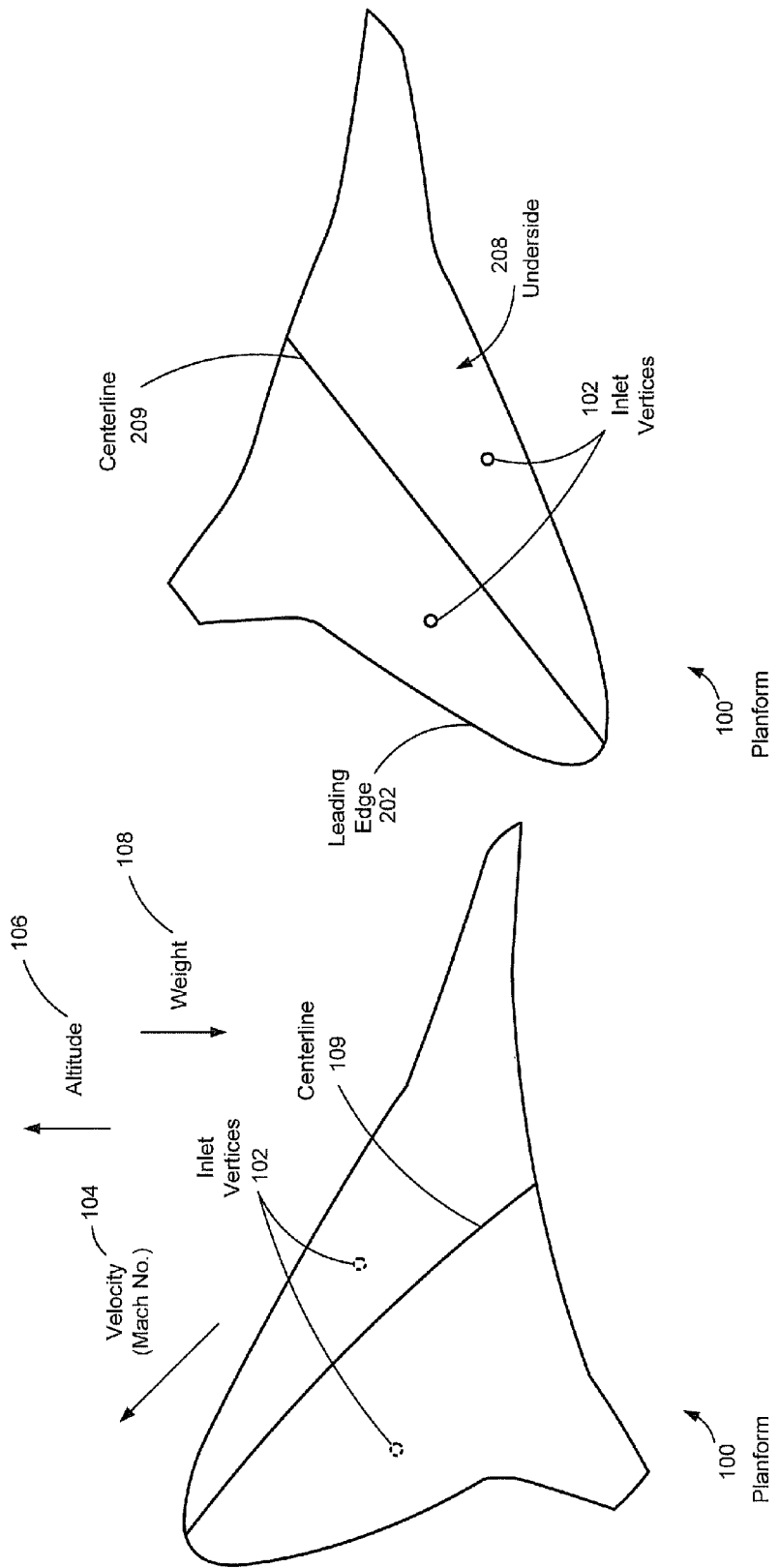

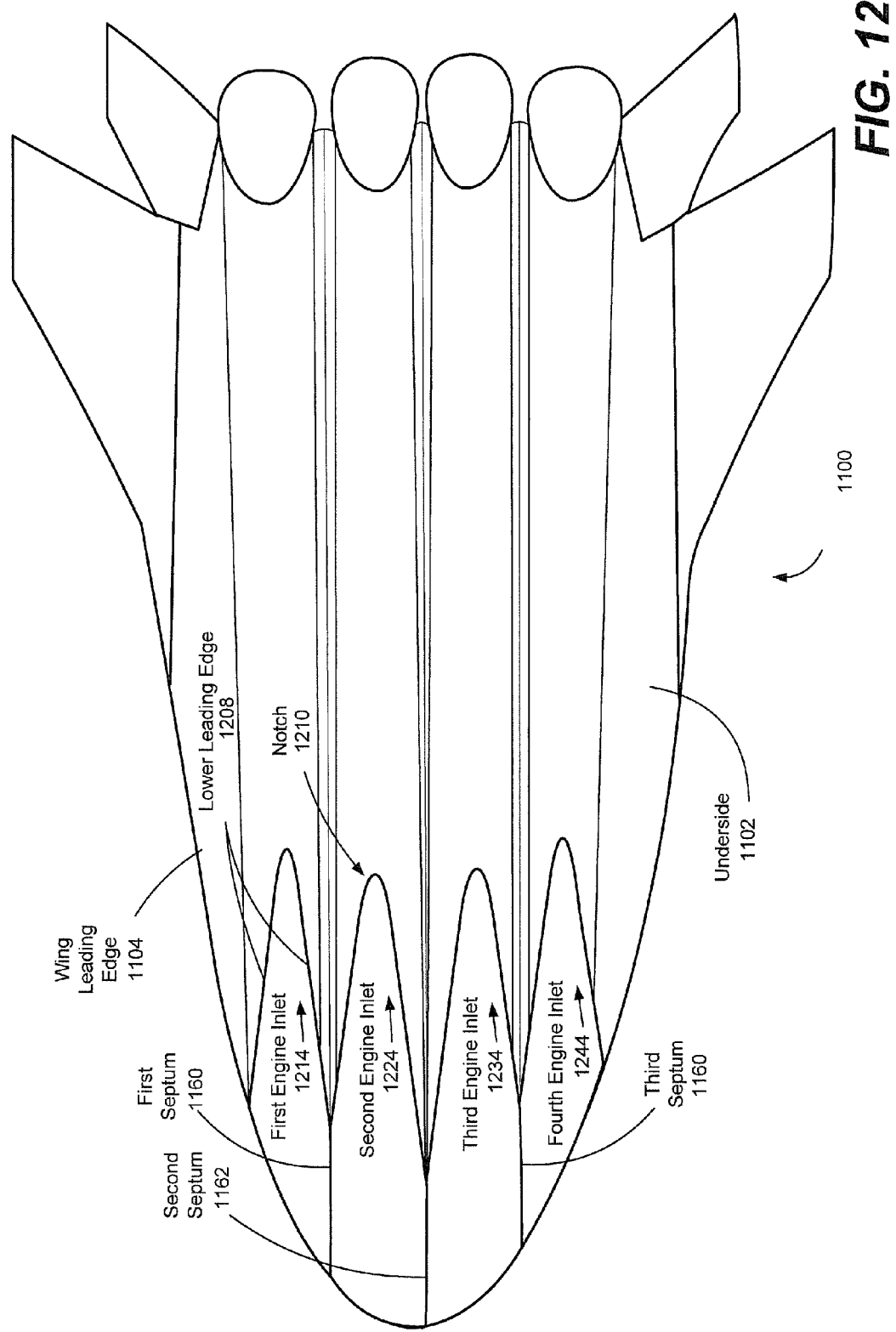

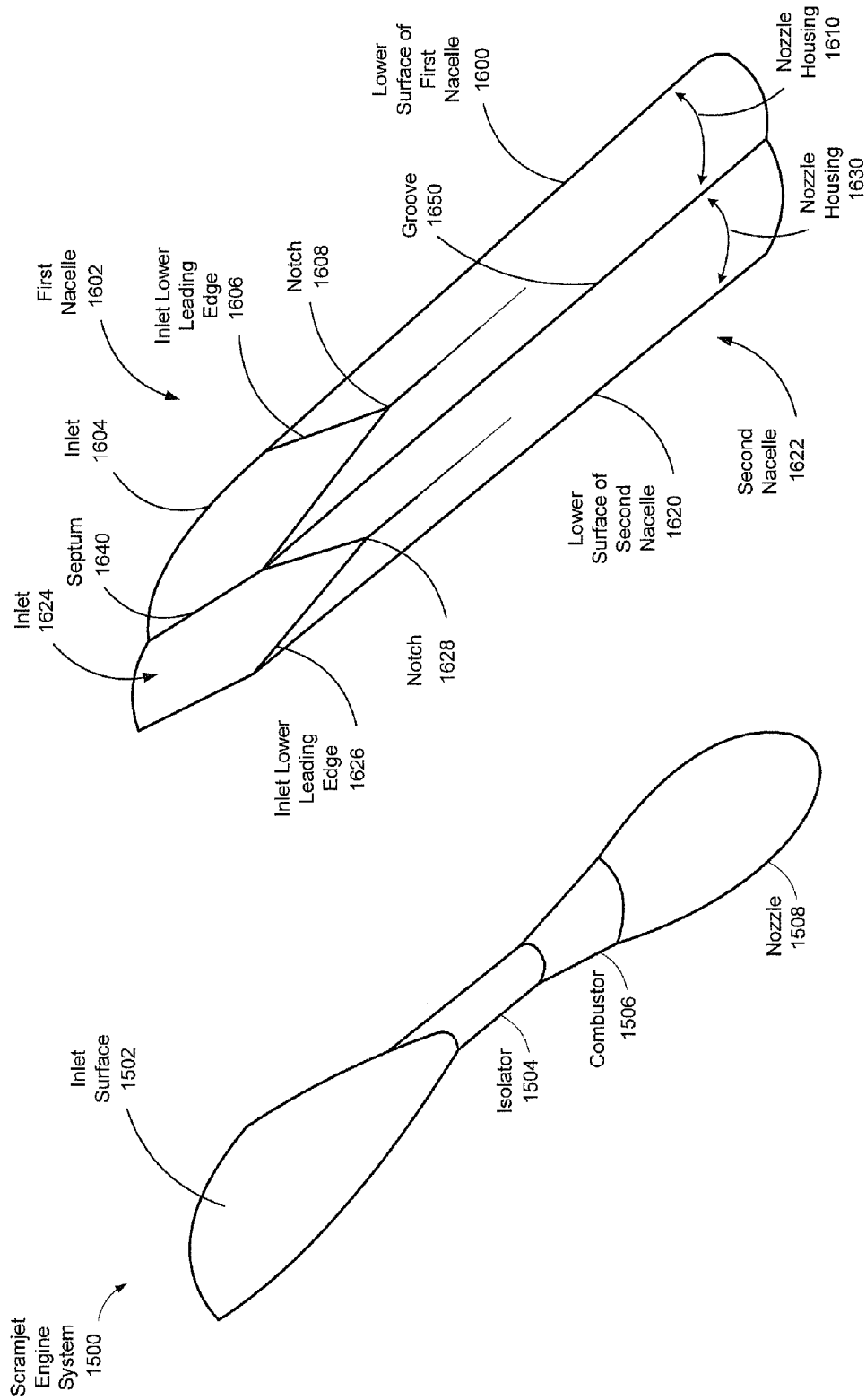

INTEGRATED HYPERSONIC INLET DESIGN

FIELD OF THE DISCLOSURE

The present disclosure is generally related to designing a shape of an engine inlet on a waverider wing of a hypersonic aircraft.

BACKGROUND

For aircraft designed for hypersonic travel (i.e., travel at several times the speed of sound), the shape of the aircraft body is very important. In traveling at such high speeds, pressure from impacted air molecules may build up in front of aircraft forward-facing surfaces, resulting in a shockwave.

For the sake of aerodynamic efficiency, wings of some hypersonic aircraft are designed to ride on this shockwave. The shockwave forms a region of pressurized air behind it under the aircraft. The shockwave is a very thin surface in the air that trails from the wing leading edge aft and it dissipates behind the vehicle. To ride the shockwave, the leading edge of the aircraft should be sharp and have a combination of sweep and deflection angles small enough to permit a shockwave to remain attached on the leading edge for the mach number of interest. The attached shockwave then traps all of the pressurized air under the vehicle rendering this kind of design more aerodynamically efficient. This kind of a wing design is called a waverider.

Another issue in the design of hypersonic aircraft is the shape of inlets for scramjets or other propulsion devices that use ambient air (as opposed to rocket engines or other self-contained propulsion devices). Although the aircraft and its inlets operate in a three-dimensional space, inlets may be modeled as two-dimensional openings perpendicular to a chosen axis. Two dimensional inlets can be designed to operate quite efficiently over a range of supersonic speeds. However, two dimensional inlets may not be as efficient as three dimensional inlets at hypersonic speeds. Therefore, there is a need for a method for designing three-dimensional inlets for hypersonic aircraft to provide for efficient engine operation without detracting from the aerodynamic efficiency of the wings of the hypersonic aircraft.

SUMMARY

Embodiments disclosed herein include aircraft, aircraft bodies, and methods for designing a shape of an engine inlet on a waverider wing of a hypersonic aircraft. Both a waverider wing of a hypersonic aircraft and engine inlets formed on the waverider wing generate shockwaves at hypersonic speeds. The shockwaves may be cones and can be represented as more general shapes but for simplicity they will hereafter be referred to as cones. A generating shockwave of a waverider wing, which will be referred to as a "wing shockwave," has an apex forward of the aircraft and widens as the generating shockwave nears a surface of the waverider wing where the shockwave may contact an edge of the waverider wing. An inlet shockwave of each engine inlet may have an apex behind an aperture to the engine that widens as it moves forward of the aircraft. When the engine inlet is shaped so that lower leading edge of the engine inlet lies at the intersection of the generating wing shockwave and the generating inlet shockwaves, the waverider wing and the engine inlets all ride on the wing shockwave, which may improve the efficiency of the aircraft.

In one particular illustrative embodiment, a wing leading edge of a planform is superimposed on a wing shockwave. The wing shockwave extends in a first direction from a wing shockwave apex toward the wing leading edge. A waverider shape is streamline traced between the wing leading edge and a trailing edge of the planform to form a waverider wing. A position of an inlet vertex is identified where the inlet vertex corresponds with an engine inlet. An inlet shockwave is projected from the inlet vertex. The inlet shockwave extends in a second direction generally opposed to the first direction and the inlet shockwave intersects the wing shockwave. An inlet leading edge of the engine inlet is defined. The inlet leading edge includes a plurality of points where the inlet shockwave intersects the wing shockwave.

In another particular illustrative embodiment, an aircraft for hypersonic flight includes a waverider wing, wherein the waverider wing includes a wing leading edge traced on a wing shockwave. The wing shockwave extends in a first direction from a wing shockwave apex toward the wing leading edge. The aircraft includes one or more engines, where each of the one or more engines has an inlet vertex. The aircraft also includes one or more engine nacelles integrated into the waverider wing. Each of the one or more engine nacelles has an inlet leading edge defined to ride on the wing shockwave. An inlet shockwave is projected from the inlet vertex. The inlet shockwave extends in a second direction generally opposed to the first direction. The inlet leading edge is defined by a plurality of points where the inlet shockwave intersects the wing shockwave.

Still another particular embodiment includes a computer-readable storage medium storing instructions executable on a computing system to generate a waverider wing with integrated engine inlets. A wing shockwave is determined to which the waverider wing may be attached in flight. The wing shockwave is determined by at least one of an anticipated velocity, altitude, and weight of an aircraft employing the waverider wing. A wing leading edge of a selected planform is projected onto the wing shockwave. An inlet vertex is positioned to correspond to a position of an intake of an engine relative to a surface of the waverider wing. An inlet shockwave for the engine is projected onto the wing shockwave. A lower portion of a leading edge of an engine inlet is defined as a locus of points where the inlet shockwave intersects the wing shockwave. An upper portion of the leading edge of the engine inlet is defined by projecting the wing leading edge onto the inlet shockwave.

By positioning leading edges of the engine inlets on the generating wing shockwave, the engine inlets can perform without altering the shockwave of the aircraft. By using three-dimensional engine inlets, engine performance may be improved for a given planform for a hypersonic vehicle.

The features, functions, and advantages that have been described can be achieved independently in various embodiments or may be combined in yet other embodiments, further details of which are disclosed with reference to the following description and drawings.

BRIEF DESCRIPTION OF THE DRAWINGS

FIG. 1 is a top perspective view of a planform of a hypersonic aircraft according to a particular illustrative embodiment;

FIG. 2 is a bottom perspective view of the planform of FIG. 1;

FIG. 12 is a bottom view of the waverider wing of FIG. 11 in which engine inlets are formed;

FIG. 15 is a perspective view of a representative scramjet engine system according to a particular illustrative embodiment;

FIG. 16 is a perspective view of outer surfaces of a pair of engine nacelles formed according to a particular illustrative embodiment;

DETAILED DESCRIPTION

Methods, aircraft, and engine nacelles are disclosed in accordance with particular embodiments of integrated hypersonic inlet design. According to a particular illustrative embodiment, a waverider wing may be formed from a planform with engine inlets integrated therewith to form a hypersonic aircraft. The waverider wing and the engine inlets may ride on a wing shockwave of the waverider wing during operation. According to another particular embodiment, given an existing planform, one or more engine inlets and engine nacelles may be designed for the waverider wing to enable the waverider wing and the engine inlets to ride on the wing shockwave. A shape of the engine inlets may be shaped by determining points of intersection of the wing shockwave and one or more inlet shockwaves produced by the engine inlets. Streamline tracing may be used to form an inner shape of the engine inlets between a leading edge of each engine inlet and an intake of the associated engine. Streamline tracing may also be used to form an outer shape of the engine nacelles between the leading edge of each engine nacelle and a trailing edge of the planform of the aircraft. When the engine inlets are shaped so that the lower leading edges of the engine inlets and the waverider wing ride on the wing shockwave, both the waverider wing and the engine inlets may operate efficiently to enhance the operation of the aircraft.

In one particular embodiment, by way of introduction rather than by way of limitation, a process of the present disclosure may include three phases. First, a leading edge of a selected planform is projected onto a wing shockwave identified based on anticipated operating parameters, such as velocity, altitude, weight, etc., for an aircraft that is to employ a resulting waverider wing. Second, an inlet shockwave, such as may be generated by an inward-turning flow field, is projected onto the wing shockwave for each engine to be included in the aircraft. A lower leading edge of an engine inlet is formed at an intersection of the wing shockwave and the inlet shockwave. An upper leading edge of the engine inlet is formed by projecting the wing leading edge onto the inlet shockwave. If more than one engine is used, septums between respective engine inlets are defined by intersection of inlet shockwaves for adjacent engines. Third, surfaces of the engine inlets are formed by streamline tracing. An inner surface of an engine inlet is defined by streamline tracing from the leading edges of the engine inlet toward an intake of the engine. An outer surface of an engine, such as that of an engine nacelle containing the engine, is formed by streamline tracing from the lower leading edge toward a rear of the waverider wing.

Figure 3:
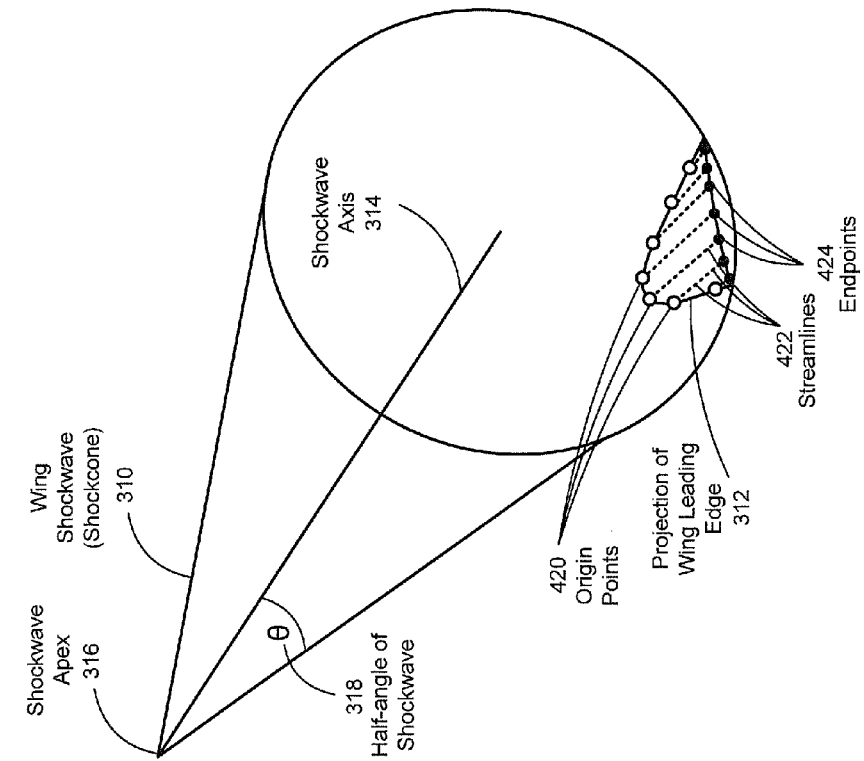
FIG. 3 is a perspective view of the planform of FIG. 1 positioned on a generating wing shockwave according to a particular embodiment.

The process of streamline tracing involves creating a fully described flow field past a body in supersonic or hypersonic conditions. This is called a generating flow field and a generating body, respectively. The generating body is a mathematical artifact and is not a part of the vehicle. The entire flow field need not be reproduced by the vehicle. The choice of body is different for wings versus inlets. For a wing one might start with a pointed body of revolution, like a cone. This will create a cone-like shockwave from the apex of the body. One then draws a wing leading edge on the cone-like shockwave. FIG. 3, for example, shows the shockwave 310 and the wing leading edge 312. The next step is to space a plurality of points along the leading edge and mathematically trace out the path a particle in the flow field would take were it to pass through one of these points. The path is called a streamline, such as the streamlines shown in FIG. 4. After tracing a plurality of such streamlines, the streamlines may be joined with a surfacing technique to form the lower surface of the waverider wing. The resulting wing will reproduce a portion of a generating flow field. A shockwave will be created that will match that portion of the generating shockwave that lies from the leading edge back, at the appropriate flight condition. The flow between the shockwave and the wing will match that portion of the generating flow field that lies beneath the wing.

Figure 13:
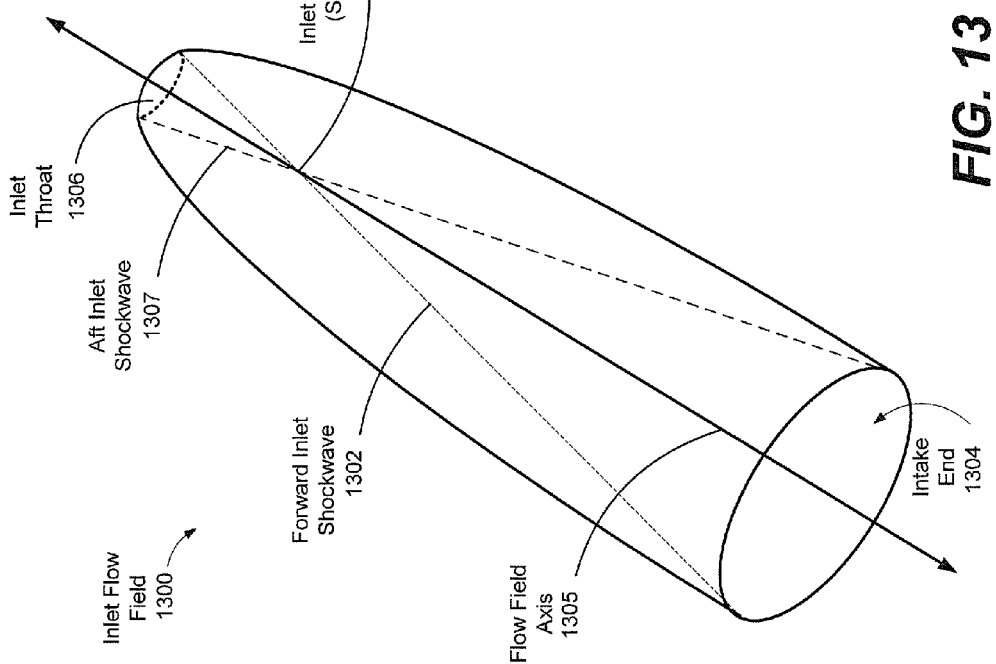
FIG. 13 is a perspective view of an inlet flow field that generates an inlet shockwave to determine a shape of an engine inlet according to a particular illustrative embodiment.

The process of streamline tracing for a three-dimensional, inward turning inlet is similar. For example, FIG. 13 shows an inward turning flow field 1300 suitable for streamline tracing an inlet, or an "inlet flow field." One common embodiment of an inward turning flow field is a Busemann inlet. The body that causes the inlet flow field 1300 to turn inward is called the generating body and the inlet flow field 1300 is called the generating flow field. In any flow field, such as the inlet flow field 1300, there is an initial shockwave, such as a forward inlet shockwave 1302, or a series of weak compression waves, that converge on an inlet shockwave vertex 1303 at an apex of the shockwave. The air or other ambient fluid flows parallel to a flow field axis 1305 until the air contacts the inlet shockwave 1302 and then the air turns inward following the walls of the generating body. There is an aft inlet shockwave 1307 that turns the flow of air back straight again before the flow of air passes to an inlet throat 1306. Note that a conical shockwave, as depicted in FIG. 13, is just one example of one type of shockwave, just as a Busemann flow field is only type of a flow field. The conical shockwave and the Busemann flow field are just examples used to illustrate embodiments according to the present disclosure.

The inlet flow field 1300 indicates a form of an inlet aperture 1410. As further described below, a shape of an engine inlet is partially determined by an intersection of an inlet shockwave 1302 with a wing shockwave (not shown in FIGS. 13 and 14). The intersection defines a lower leading edge of an engine inlet scoop perimeter 1420. Also further described below, a shape of an engine inlet is partially determined by a projection of a wing planform (not shown in FIGS. 13 and 14) onto an upper portion of an inlet shockwave 1302. The projection defines an upper leading edge of an engine inlet scoop perimeter 1420. Projecting both portions of the engine inlet scoop perimeter 1420 forward toward an intake end 1304 of the inlet flow field 1300 defines the inlet aperture 1410 having an aperture bottom 1412 and an aperture top 1414, respectively.

To streamline trace the engine inlet, one then follows the streamline tracing process used for the wing. A plurality of points lie on the leading edge around the engine inlet scoop perimeter 1420. Streamlines within the inlet flow field 1300 are traced. The streamlines will be joined together with a surfacing technique to create the engine inlet. The resulting inlet will reproduce the portions of the generating shockwave and flow field that lie within the surface of the inlet.

FIG. 1 is a top perspective view of a planform 100 of a hypersonic aircraft according to a particular illustrative embodiment. The planform 100 has two inlet vertices 102 for which engine inlets may be designed. Planforms, such as the planform 100, may be selected based on various design considerations including a projected velocity 104 at which the hypersonic aircraft may operate and an altitude 106 at which the hypersonic aircraft is expected to operate as well as an anticipated weight 108 of the aircraft employing a waverider wing formed according to embodiments of the present disclosure. In addition, a shape of the planform 100 may be determined by how many passengers or what sort of payload the hypersonic aircraft will carry, what types of engines the hypersonic aircraft will use, a desired range of the hypersonic aircraft, and other factors. The planform 100 has a centerline 109 along a central plane bisecting the planform. The centerline 109 is curved in FIG. 1 to illustrate the convex shape of an upper surface of the planform 100. These considerations also may determine a type and quantity of fuel to be carried on board which may further define the dimensions of the planform 100.

FIG. 1 shows the two engine inlet vertices 102 (in dashed lines) that position engine inlets for engines that will be used to power the hypersonic aircraft. The inlet vertices 102 are presented as dashed lines because the engine inlets are not positioned on an upper surface of the planform 100 but, instead, are positioned beneath an underside of the aircraft. The placement of the inlet vertices 102 may be determined by the types of engines to be used in powering the hypersonic aircraft. For example, the hypersonic aircraft may use scramjet engines for which a certain engine size may be estimated. The estimated engine size and other considerations may determine at least an initial projection of where the engine inlets 102 may be placed on the planform 100.

FIG. 2 is a bottom perspective view of the planform 100 of FIG. 1. The bottom view of the planform shows the placement of the inlet vertices 102 on a substantially flat underside 208 of the planform 100. As described further with reference to FIGS. 4 and 5, an actual shape of the underside of a waverider wing used in a hypersonic aircraft may be formed by streamline tracing. The planform 100 may be used to determine where a leading edge 202 of the waverider wing will ride on the wing shockwave. Streamlines may be projected from the leading edge 208 to determine the shape of the waverider wing. A centerline 209 bisects the underside 208 of the planform 100.

FIG. 3 is a perspective view of the planform 100 of FIG. 1 positioned in a generating shockwave 310. FIG. 3 shows a wing leading edge 312 of the planform 100 (the planform 100 is represented by a dotted line in FIG. 3 to highlight the wing leading edge 312). The wing leading edge 312 may be a projection of where the planform 100 may intersect the wing shockwave 310. The generating shockwave 310 extends along a shockwave axis 314 from a wing shockwave apex 316. The generating shockwave 310 widens as it approaches the planform 100. In the example of FIG. 3, the wing shockwave 310 is a conical shockwave that may be determined based on the anticipated velocity 104 and the operational altitude 106 described with reference to FIG. 1. The wing shockwave 310 may be defined by a shockwave half-angle θ 318.

Figure 4:
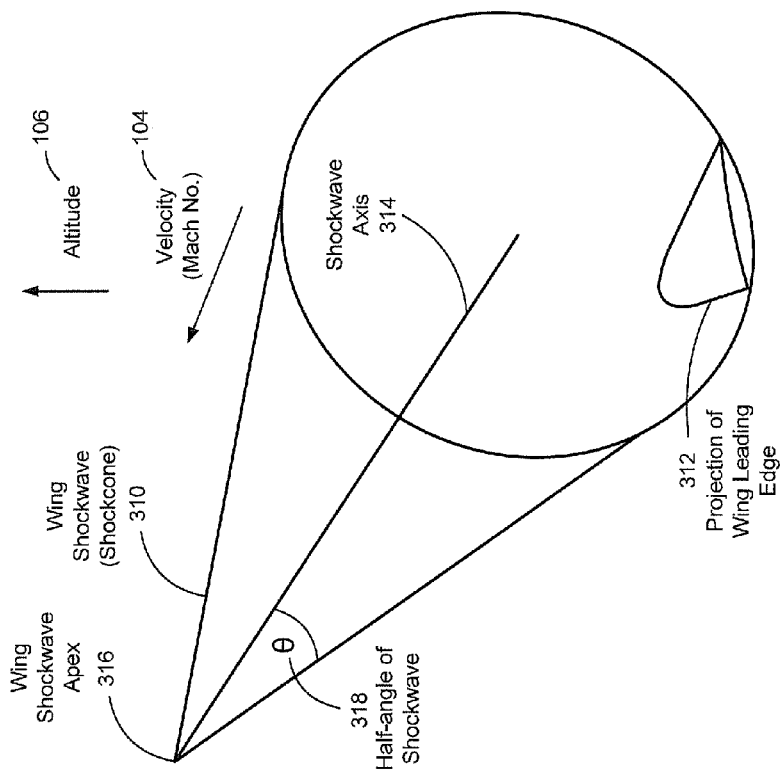
FIG. 4 is a perspective view of the formation of a waverider wing shape using streamline tracing according to a particular embodiment.

FIG. 4 is a perspective view of the formation of a waverider wing shape using streamline tracing according to a particular embodiment. In a particular embodiment, streamline tracing may be used to determine a waverider wing shape rearward of the wing leading edge 312. A plurality of origin points 420 may be selected along the wing leading edge 312. Streamline tracing from the origin points 420 may be performed to generate streamlines 422 that define a shape of the waverider wing.

Figures 5, 6:
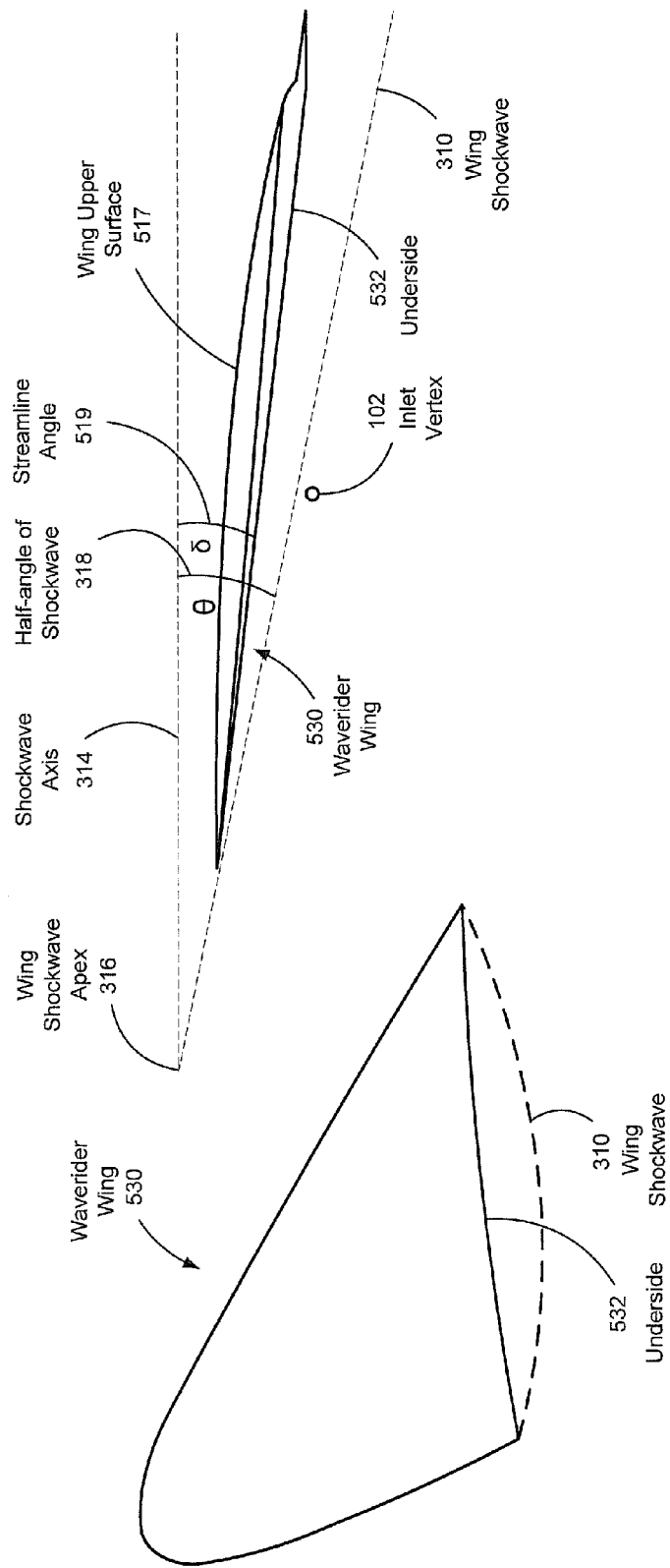
FIG. 5 is a perspective view of a waverider wing formed according to a particular illustrative embodiment of streamline tracing.
FIG. 6 is a side view of the waverider wing of FIG. 5.

FIG. 5 is a perspective view of a waverider wing 530 formed according to a particular illustrative embodiment of streamline tracing, such as the streamline tracing described with reference to FIG. 4. Using streamline tracing as depicted in FIG. 4, the resulting waverider wing 530 has an underside 532 which may be slightly curved, an aspect which is more apparent in FIG. 6.

FIG. 6 is a side view of the waverider wing 530 of FIG. 5. FIG. 6 shows the inlet vertex 102 positioned below the underside 532 of the waverider wing 530. The underside 532 of the waverider wing 530 rides above the wing shockwave 310. A position of one of the inlet vertices 102 is shown relative to the underside 532 of the waverider wing 530. As described further below, the position of the inlet vertex 102 relative to the underside 532 may affect the shape of an inlet formed for the inlet vertex 102. The underside 532 begins at an initial streamline angle δ 519 below the shockwave axis 304.

Figure 7:
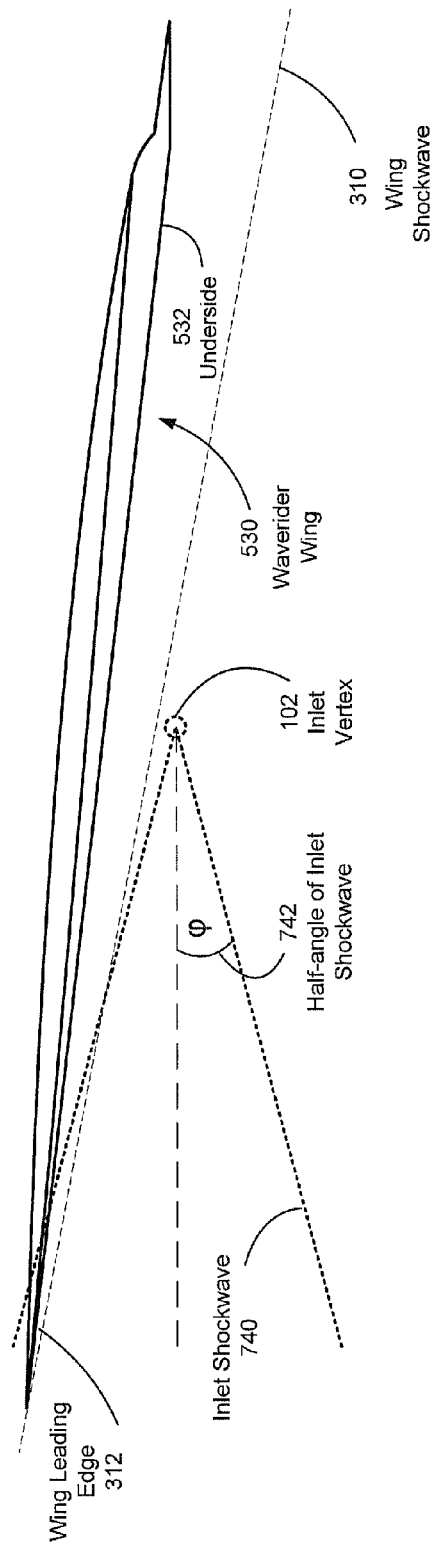
FIG. 7 is a side section view of the waverider wing of FIG. 6 showing an inlet shockwave projected from the inlet vertex.

FIG. 7 is a side section view of the waverider wing 530 of FIG. 6. FIG. 7 shows an inlet shockwave 740 projected from the inlet vertex 102. The inlet shockwave 740 may be defined by a half angle φ 742. The inlet shockwave 740 and the half angle φ 742 may be determined based on characteristics of an engine (not shown in FIG. 7) to be positioned relative to the inlet vertex 102. For example, the inlet shockwave 740 and the half angle φ 742 may influence a capture area of the inlet. The capture area is defined by the cross-sectional area of the air that enters the engine. A good illustration is all or a fraction of the area enclosed by an engine inlet 1710 shown in FIG. 17 and defined by curves 1710, 1712, and 1714. If there are several inlets then all the inlet capture areas are added. According to a particular illustrative embodiment, boundaries of an engine inlet 844 are determined by a plurality of points at which the inlet shockwave 740 intersects the wing shockwave 310.

Figure 8:
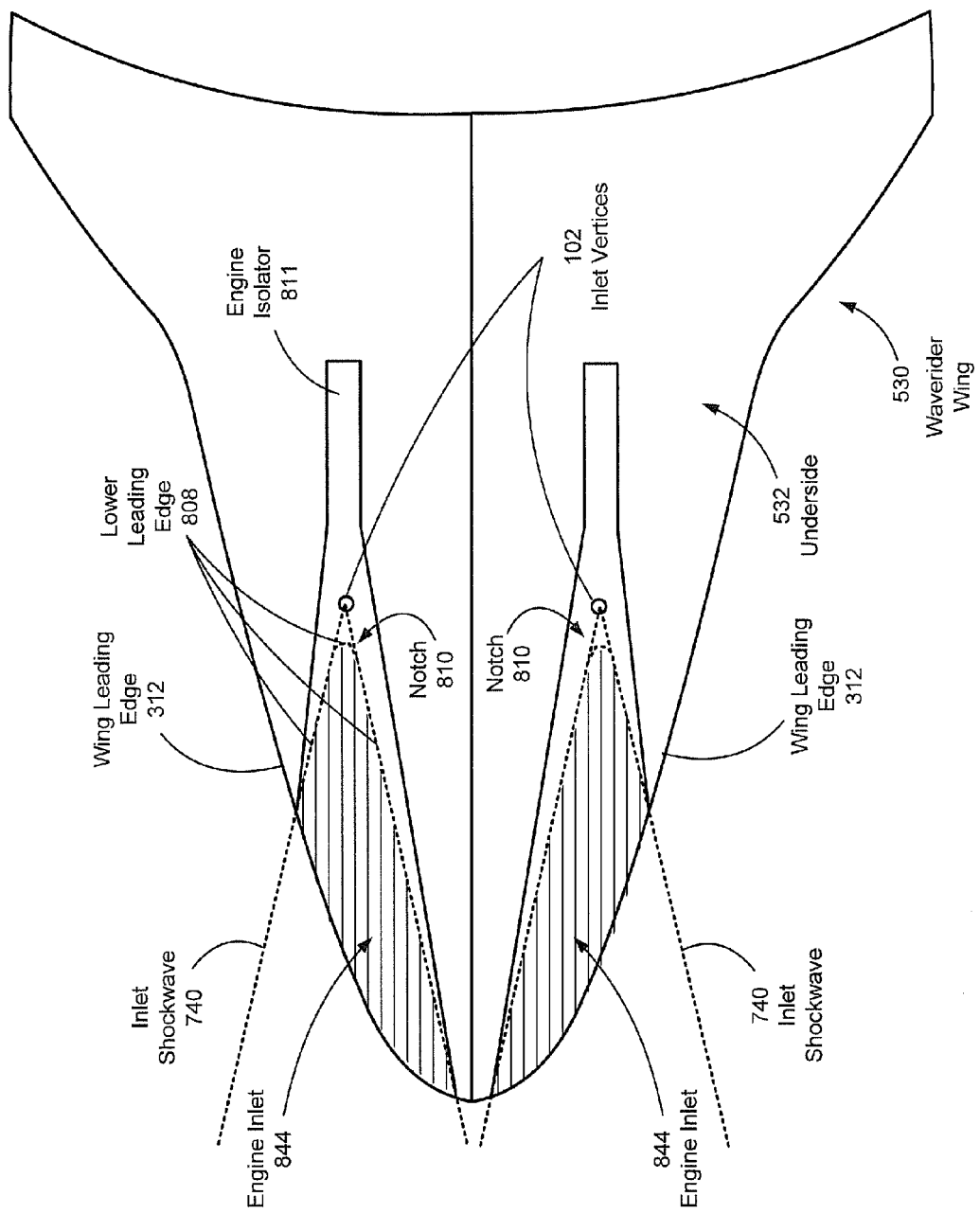
FIG. 8 is a bottom view of the waverider wing showing two engine inlets according to a particular embodiment.

FIG. 8 is a bottom view of the waverider wing 530 showing two engine inlets 844 formed for the inlet vertices 102 according to a particular embodiment. As in the cutaway side view of FIG. 7, the inlet shockwaves 740 extend from the inlet vertices 102. The inlet shockwaves 740 intersect the wing shockwave 310 along a lower leading edge 808 of the engine inlet 844. An engine isolator 811, described further with reference to FIG. 15, positioned rearward of the engine inlet 844 receives a flow of gas from the engine inlet and channels the flow into other portions of an engine (not shown in FIG. 8).

Figure 9:
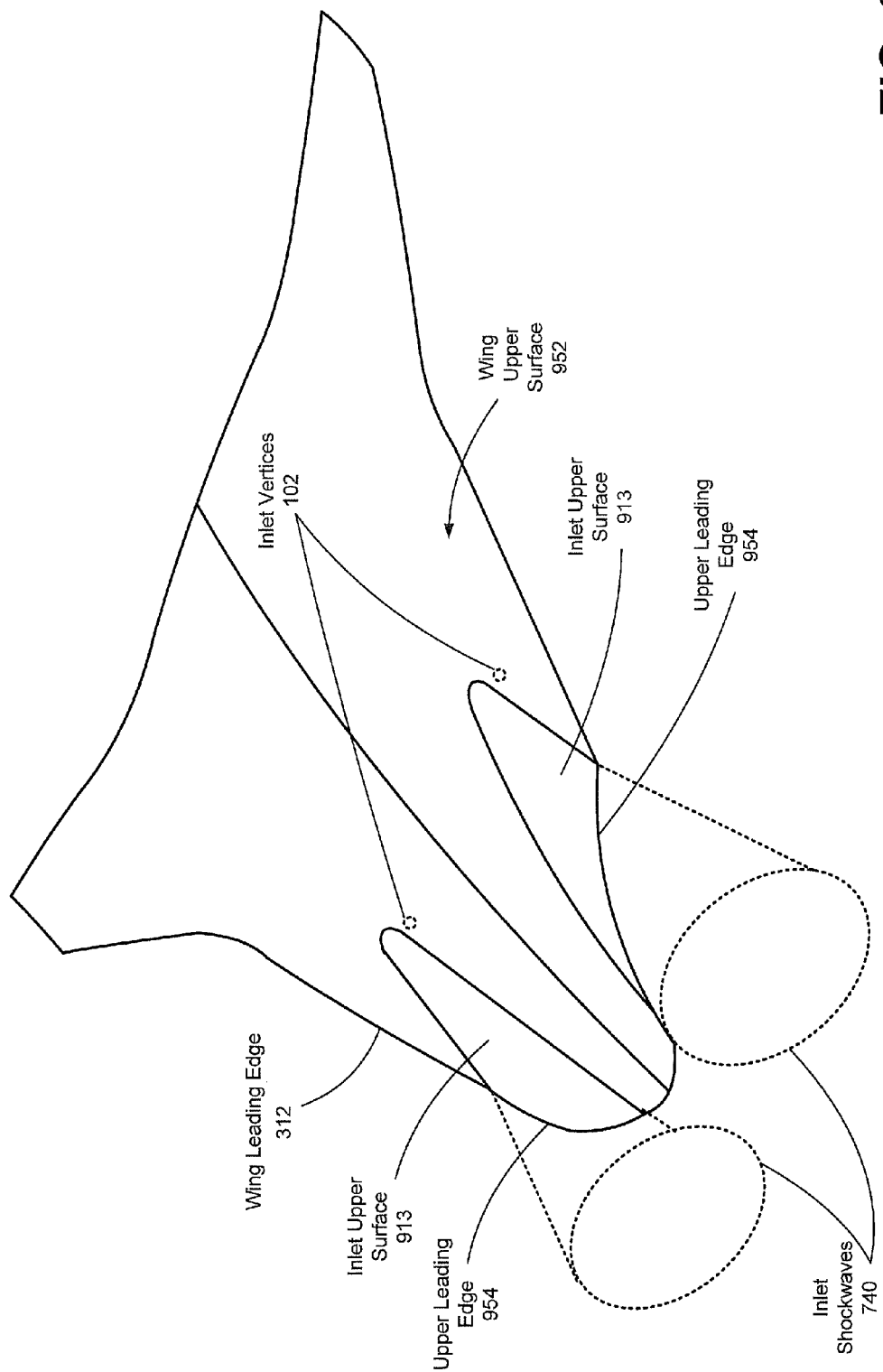
FIG. 9 is a top perspective view of a wing upper surface on which the planform is projected on the inlet shockwaves in forming the engine inlets.

FIG. 9 is a top perspective view of a section of a wing upper surface 952 with the wing leading edge 312 projected on the upper portion of the inlet shockwaves 740 in forming the engine inlets. The wing leading edge 312 thus may be projected onto the upper portion of the inlet shockwaves 740 in forming the upper leading edge 954 of each engine inlet. An inlet upper surface 913 is shown in FIG. 9, inscribed within a curve generated by the projection of the wing leading edge 312 onto the upper portion of the inlet shockwave 740. A form of the inlet upper surface 913 may be determined by streamline tracing from the upper leading edge 954, as previously described.

Figure 10:
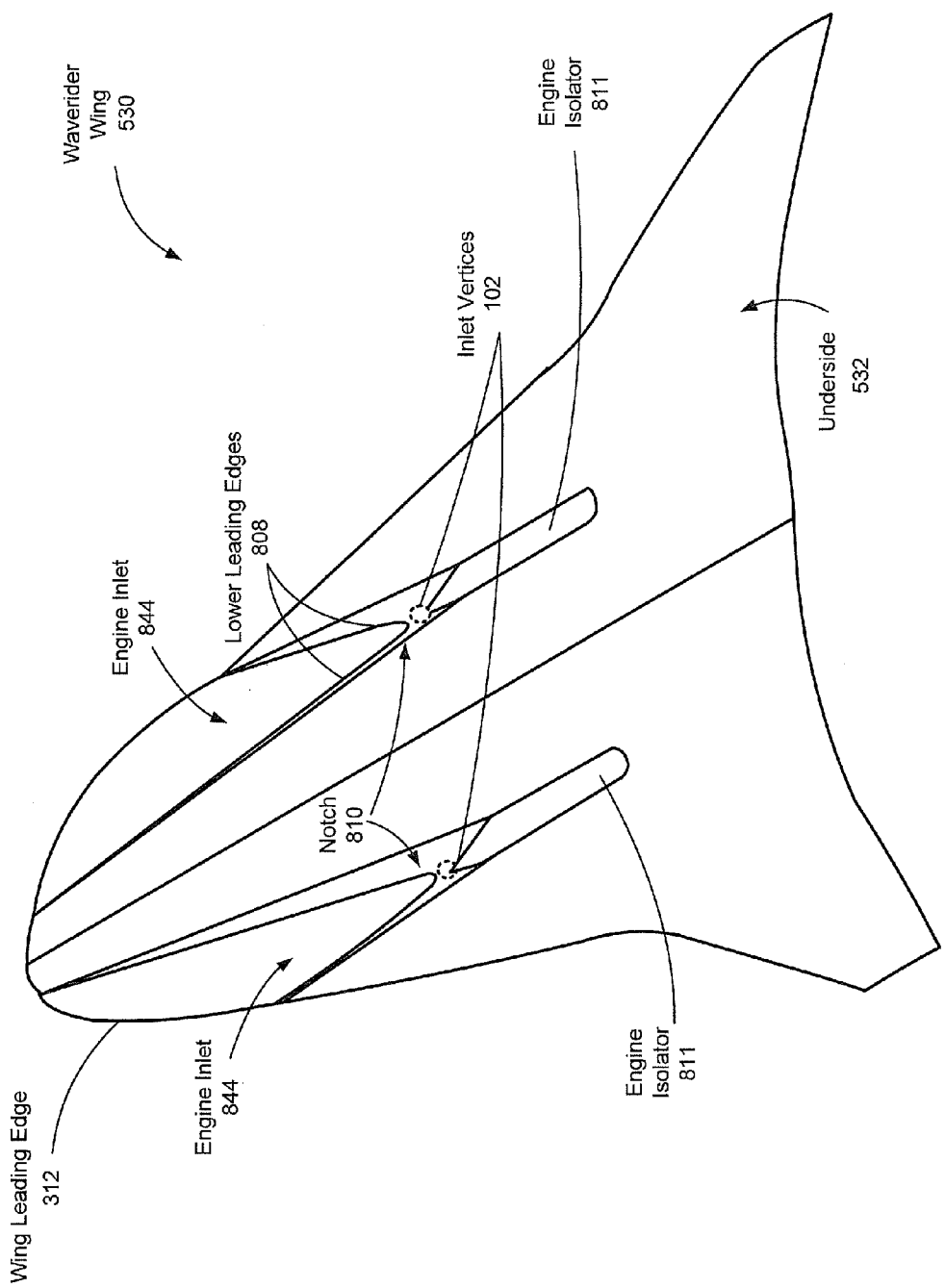
FIG. 10 is a side perspective view of a waverider wing and engine inlets formed according to a particular illustrative embodiment.

FIG. 10 is a side perspective view of the waverider wing 530 and the engine inlets 844 formed according to a particular illustrative embodiment. The engine inlets 844 may also be bounded by an upper leading edge 954. Curve 954 may be formed by projecting the wing leading edge 312 upward onto the upper portion of the inlet shock cone. Because lower leading edges 808 of the engine inlets 844 lie on the generating wing shockwave, the engine inlets 844 may participate in waveriding with the waverider wing 530.

FIG. 10 is a side perspective view of just one possible form of a waverider wing 530. Using embodiments of the present disclosure, the inlet vertices 102 may be repositioned to reshape and reposition the engine inlets 844. In a particular embodiment, the inlet vertices 102 of FIG. 9 may be repositioned to accommodate different engines, to adjust a payload configuration, or for any number of additional reasons. Repositioning the inlet vertices 102 may result in a change in the shape or size of the engine inlets 844 of FIG. 9. For example, if the inlet vertices 102 are moved further forward, the engine inlets may be shorter and narrower than the engine inlets 844 shown in FIG. 9. In another example, the repositioned inlet vertices 102 may be moved farther from the front of the waverider wing 530, resulting in longer engine inlets. Also, the inlet vertices 102 may be moved farther from or closer to the underside 532 of the waverider wing 530.

In yet another example, the repositioned inlet vertices 102 may be moved farther from one another or closer to one another than the inlet vertices 102 of FIG. 9. According to a particular illustrative method, repositioning the inlet vertices 102 changes a point from which inlet shockwaves are projected and, in turn, may change points at which the inlet shockwaves and the wing shockwave intersect. Intersection of the shockwaves may determine shapes of the engine inlets 844. Thus, particular illustrative embodiments enable adjustment of the engine inlets 844 in response to repositioning of the inlet vertices 102.

In the example of FIGS. 1-10, the planform 100 and the resulting waverider wing 530 include two inlet vertices 102 resulting in two engine inlets 844. The engine inlets 844 are spaced far enough apart such that the engine inlets 844 do not interfere with one another. However, when the inlet vertices 102 are more closely spaced or when there are additional inlet vertices included in the same space, the inlet shockwaves, such as the inlet shockwaves 740 FIG. 7, may intersect. Other illustrative embodiments, as described with reference to FIGS. 11-18, account for more closely spaced inlet vertices, inclusion of additional engines, and potential interference of adjacent inlet shockwaves.

Figure 11:
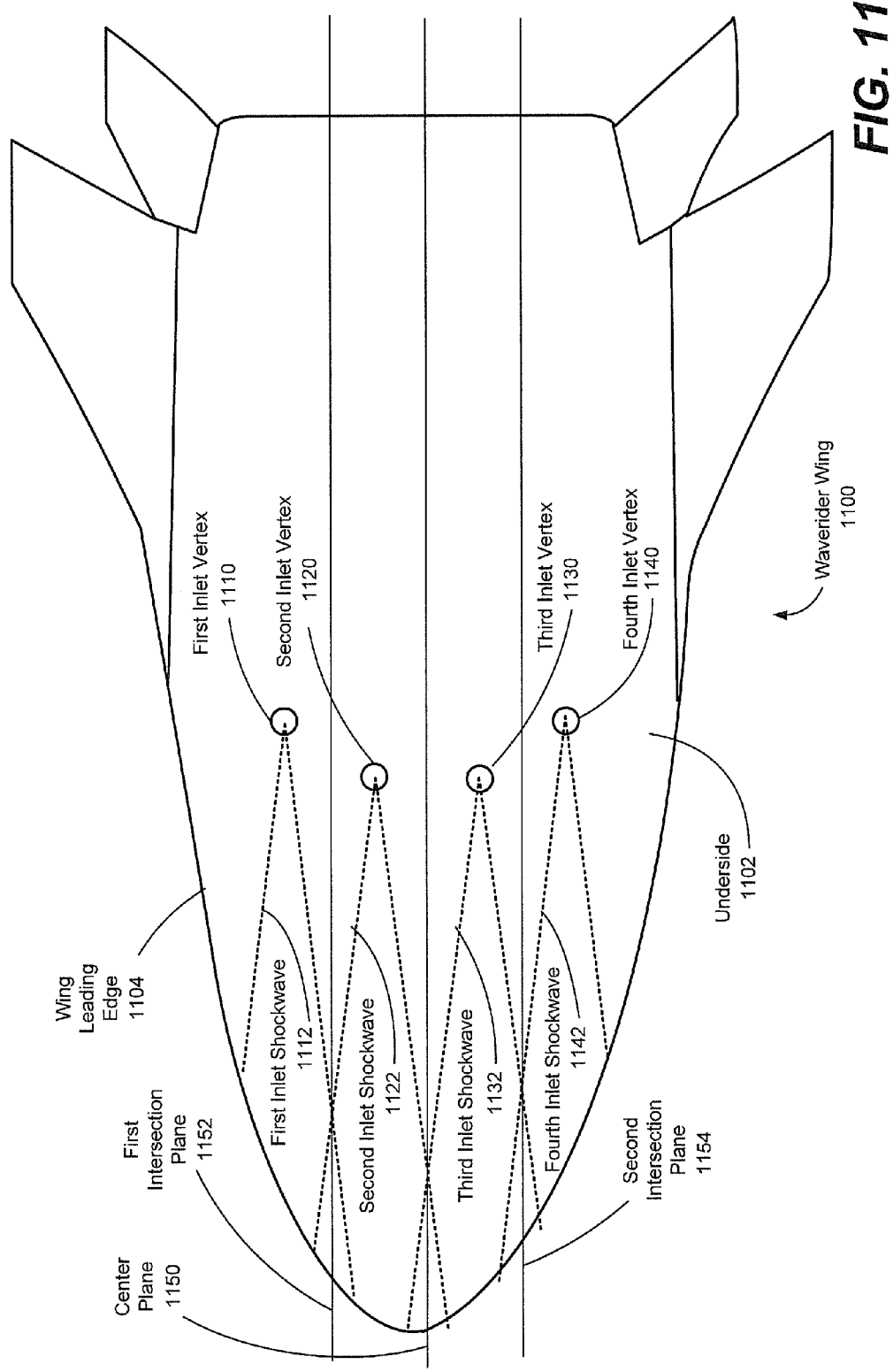
FIG. 11 is a bottom view of a waverider wing including a plurality of inlet vertices formed according to a particular illustrative embodiment.

FIG. 11 is a bottom view of a waverider wing 1100 including a plurality of inlet vertices 1110, 1120, 1130, 1140 according to a particular illustrative embodiment. An underside 1102 of the waverider wing 1100 may be designed using streamline tracing from a wing leading edge 1104 that is projected from a planform as described with reference to FIGS. 1-4. In a particular illustrative embodiment, such as shown in FIG. 11, the underside 1102 may be curved. The waverider wing 1100 includes the four inlet vertices including a first inlet vertex 1110, a second inlet vertex 1120, a third inlet vertex 1130, and a fourth inlet vertex 1140. The first inlet vertex 1110 and the second inlet vertex 1120 are on a first side of a center plane 1150 of the waverider wing 1100. The third inlet vertex 1130 and the fourth inlet vertex 1140 are on a second side of the center plane 1150. The center plane 1150 may be a plane of symmetry of the underside 1102 of the waverider wing 1100.

The inlet vertices 1110, 1120, 1130, 1140 may project inlet shockwaves, such as a first inlet shockwave 1112, a second inlet shockwave 1133, a third inlet shockwave 1132, and a fourth inlet shockwave 1142, respectively. Adjacent inlet shockwaves may intersect each other. For example, the first inlet shockwave 1112 may intersect the second inlet shockwave 1122 at a first intersection plane 1152. The second inlet shockwave 1122 may intersect a third inlet shockwave 1130 at the center plane 1150. According to a particular illustrative embodiment, engine inlets are bounded at planes where one inlet shockwave intersects another inlet shockwave. In another example, the third inlet shockwave 1132 intersects the fourth inlet shockwave 1142 at a second intersection plane 1154. The inlet shockwaves 1112, 1122, 1132, 1142, according to a particular illustrative embodiment, are conical shockwaves. Thus, the intersections of the inlet shockwaves 1112, 1122, 1132, 1142 may define planar sections. In the example of FIG. 11, the planar sections lie on the first intersection plane 1152, the center plane 1150, and the second intersection plane 1154. According to a particular illustrative embodiment, septums are placed at the planar sections where the inlet shockwaves 1112, 1122, 1132, 1142 intersect each other or the center plane 1150. The septums may be bounded by intersections of the inlet shockwaves 1112, 1122, 1132, 1142 with the wing shockwave (not shown in FIG. 11) that determines the form of underside 1102 of the waverider wing 1100. Note that although the second inlet shockwave 1122 and the third inlet shockwave 1132 intersect at the center plane 1150, there may be no septum at the center plane 1150 in every design. For example, in a design with three engines, there may be septums between each pair of engines, but a center engine may straddle the center plane 1150 of the aircraft.

FIG. 12 is a bottom view of the waverider wing 1100 of FIG. 11 in which engine inlets 1214, 1224, 1234, 1244 are formed. The engine inlets 1214, 1224, 1234, 1244, each having lower leading edges 1208 that describe a characteristic notch 1210. The shape of the engine inlets 1214, 1224, 1234, 1244 may be formed, in part, based on intersections of the inlet shockwaves 1112, 1122, 1132, 1142 of FIG. 11 and the wing shockwave that defines the underside 1102 of the waverider wing 1100. The engine inlets 1214, 1224, 1234, 1244, according to a particular illustrative embodiment, may extend to the wing leading edge 1104. Also, the engine inlets 1214, 1224, 1234, 1244 may be separated from one another by septums 1260, 1262, 1264. For example, a first engine inlet 1214 and a second engine inlet 1224 may be separated from one another by a first septum 1260 that lies on the first intersection plane 1152. The second engine inlet 1224 and a third engine inlet 1234 may be separated by a second septum 1262 that lies on the center plane 1150. The third engine inlet 1234 and a fourth engine inlet 1244 may be separated by a third septum 1260 that lies on the second intersection plane 1154.

Note that, depending on the relative elevations of inlet vertices 1110, 1120, 1130, 1140 of FIG. 11, the first intersection plane 1152, the center plane 1150, and the second intersection plane 1154 may be parallel planes. However, in particular embodiments, the first intersection plane 1152, the center plane 1150 and the second intersection plane 1154 may not be parallel planes. For example, as described with reference to FIG. 20, septums separating engine nacelles (FIG. 19) bounding the engine inlets 1214, 1224, 1234, 1244 may not lie in parallel planes. Thus, if the inlet vertices 1110, 1120, 1130, 1140 were positioned differently, the first intersection plane 1152 and the second intersection plane 1154 may intersect with the center plane 1150.

FIG. 13 is a perspective view of a generating inlet flow field 1300 according to a particular embodiment. The generating inlet flow field 1300 may generate an inlet shockwave that projects from an inlet vertex. The inlet flow field 1300 may be used to determine a shape of an engine inlet according to a particular illustrative embodiment. The inlet flow field 1300 may be an inward turning flow field, such as a Busemann flow field, or another type of inward turning flow field. Inward turning refers to the flow all turning in towards the centerline of the flow field. The inlet flow field 1300 may have a forward inlet shockwave 1302 such as inlet shockwaves previously described. The inlet flow field 1300 intakes atmospheric gases at an intake end 1304, compresses the atmospheric gases and delivers the compressed gases to an engine via an inlet throat 1306.

Figure 14:
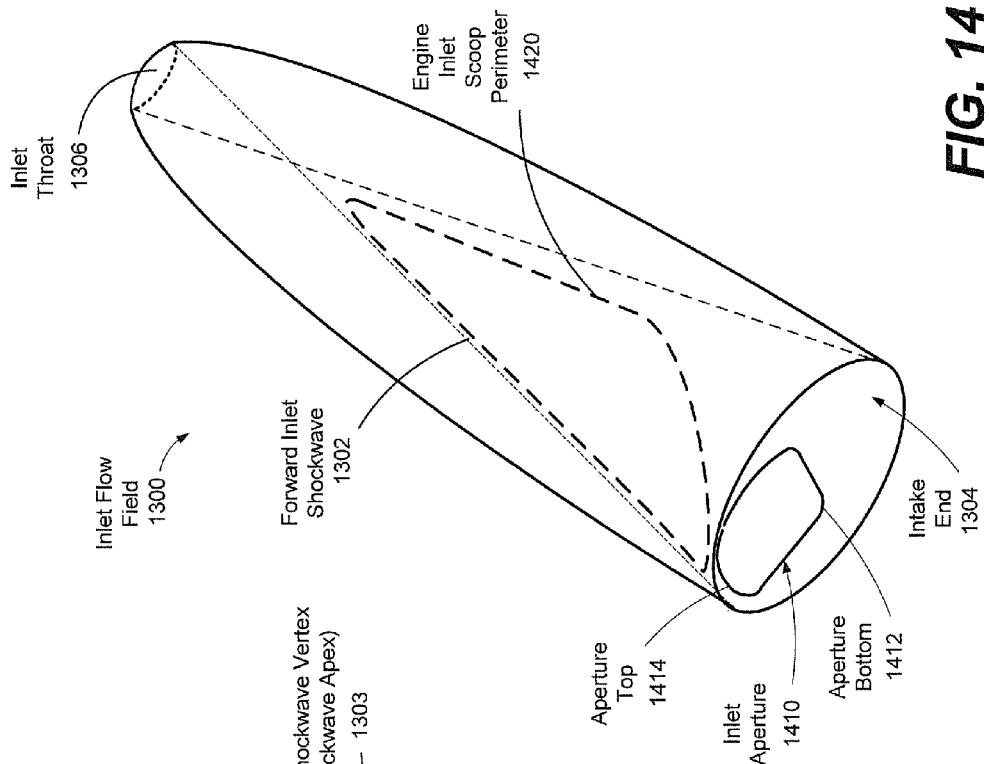
FIG. 14 is a perspective view of the inlet flow field of FIG. 13 onto which an inlet aperture is projected to determine an internal shape of an engine inlet.

FIG. 14 is a perspective view of the inlet flow field 1300 of FIG. 13 according to a particular embodiment. As previously described, a shape of an inlet aperture 1410 is determined by projecting the shape of the engine inlet scoop perimeter 1420 forward toward the intake end 1304 of the inlet flow field 1300. A shape of the lower leading edge 808 (FIG. 8) may be indicated by a shape of the engine inlet 844 as previously described. For example, as shown in FIGS. 8, 9, 11, and 12, lower leading edges 1208 formed according to particular illustrative embodiment have v-shaped notches 1210 along curved, bottom surfaces of the waverider wings where inlet shockwaves intersect wing shockwaves. Thus, the inlet aperture 1410 has a v-shaped notch 1210 at an aperture bottom 1412 to conform the inlet aperture 1410 to the shape of the lower leading edges 1208. Also, as illustrated in FIG. 12 and as previously described, an upper surface of an engine inlet may have a rounded surface that generally follows a shape of the inlet shockwave as a result of the wing leading edge being projected onto the inlet shockwave, although the engine inlets may be limited by a septum on one or both sides. As a result, the engine inlet aperture 1410 may have an irregular shape After the shape of the inlet aperture 1410 is identified, a shape of an interior of the inlet, or an inlet surface 1402, may be formed by streamline tracing. For example, the streamline tracing to identify the shape of the interior of the inlet may be similar to the streamline tracing described with reference to FIG. 4 to define the curved underside of the waverider wing. If a shape of the engine aperture 1410 is changed, e.g., as a result of changing a shape of the lower leading edge 1208 or another design choice, a resulting shape of the inlet surface 1402 may also be changed.

FIG. 15 is a perspective view of a representative scramjet engine system 1500 according to a particular illustrative embodiment. In a particular embodiment, an engine nacelle may be formed around the scramjet engine system 1500. The scramjet engine system 1500 illustrates just one type of engine system that may be used to power a hypersonic aircraft. The scramjet engine system 1500 may include an engine inlet surface 1502 similar to the engine inlets previously described. The engine inlet surface 1502 collects and compresses atmospheric gases to facilitate powering the scramjet engine system 1500. The scramjet engine system 1500 also includes an isolator 1504, a scramjet combustor 1506, and a nozzle 1508.

The isolator 1504 is present to keep pressure disturbances that may form in the combustor 1506 from traveling forward along the walls into the inlet causing an inlet unstart. Isolators 1504 contain reverse migration of shockwaves toward the engine inlet surface 1502 and thus protect against unstart at lower Mach numbers for engines that are optimized for some higher Mach number. (An inlet unstart occurs when shockwaves internal to an engine inlet, an isolator, or both are expelled out of the engine in a direction opposite an expected intake flow. A resulting standing shockwave in front of the engine inlet may cause air to spill from the engine inlet that cannot be contained by the isolator 1504, reducing engine performance.) The nozzle 1508, although not previously shown in the figures, generally is disposed at a rear of an aircraft to help drive the aircraft forward.

FIG. 16 is a perspective view of outer surfaces 1600, 1620 of a pair of engine nacelles 1602, 1622, respectively, formed according to a particular illustrative embodiment. The engine nacelles 1602, 1622 are formed around a pair of adjacent scramjet engine systems, such as the scramjet engine system 1800 of FIG. 18. Inlets 1604, 1624 may be formed as described with reference to FIGS. 11 and 12. The inlets 1604, 1624 are defined by a leading edge and a curved inward turning surface, as shown in FIGS. 11 and 12, and are divided by a septum 1640 where inlet shockwaves for the inlets 1604, 1624 intersect.

A first lower surface 1600 of a first nacelle 1602 may be formed by streamline tracing. For example, the first lower surface 1600 of first nacelle 1602 may be formed by streamline tracing from an inlet lower leading edge 1606 rearward toward a nozzle housing 1610 that may cover, for example, a thrust nozzle 1808 of a scramjet engine system 1800 as in FIG. 18. Streamline tracing may result in the first lower surface 1600 being creased adjacent the inlet lower edge 1606 of the first nacelle 1602 where the inlet lower leading edge 1606 forms a notch 1608. Rearward, toward the nozzle housing 1610, the first lower surface 1600 of the first nacelle 1602 may be curved in cross-section to blend into the edge of the nozzle, deviating away from the streamline tracing toward a rear of the engines. For a second nacelle 1622, streamline tracing may form a second lower surface 1620 that is similar to the first surface 1600. For example, streamline tracing from a inlet lower leading edge 1626 rearward toward a nozzle housing 1630 results in the second lower surface 1620 of the second nacelle 1622 being creased where the inlet lower leading edge 1626 forms a notch 1628. Rearward, toward the nozzle housing 1630, the second lower surface 1620 of second nacelle 1622 may be curved in cross-section. Curvature of the lower surfaces 1600, 1620, due to an intersection between the two inlets 1604 and 1624 may result in a groove 1650 extending between the lower surfaces 1600, 1620 between the nacelles 1602, 1622.

Figure 17:
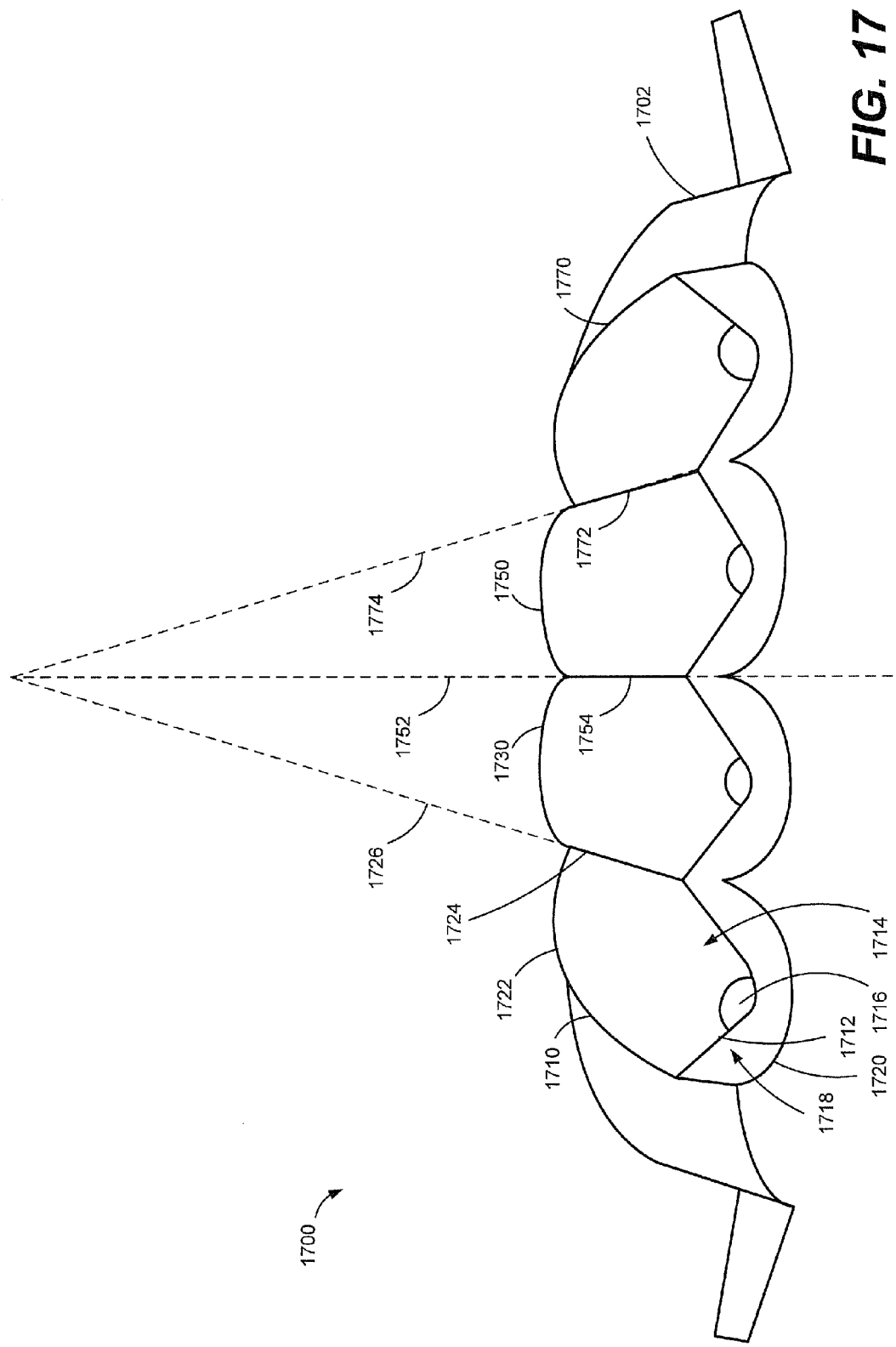
FIG. 17 is a front perspective view of a waverider wing with integrated engine inlets according to a particular illustrative embodiment.

FIG. 17 is a front perspective view of a waverider wing 1700 with integrated engine inlets 1710, 1730, 1750, 1770 according to a particular illustrative embodiment. The waverider wing 1700 has a leading edge 1702 that rides on a wing shockwave as described with reference to FIGS. 3 and 4. Four engine inlets 1710, 1730, 1750, 1770 are formed within the waverider wing 1700. For example, the engine inlets 1710, 1730, 1750, 1770 may be formed as described with reference to FIGS. 1-16. For example, a first engine inlet 1710 has a lower leading edge 1712 formed according to intersections of the inlet shockwave and the wing shockwave (not shown in FIG. 17). An inner inlet surface 1714 of the engine inlet 1710 may be formed by streamline tracing from the lower leading edge 1712 toward an intake of an engine 1716. A lower, outer surface 1718 of an engine nacelle bounding the engine inlet 1710 may be formed by streamline tracing from the leading edge 1712 toward a trailing edge 1720 of the waverider wing 1700. An upper edge or upper portion of the inlet leading edge 1722 may be formed by projecting a wing leading edge 1702 of the waverider wing 1700 onto an inlet shockwave (not shown in FIG. 17).

In the case of the first engine inlet 1710, one side of the engine inlet 1710 is bounded by a septum 1724 separating the first engine inlet 1710 from a second engine inlet 1730. Note that the septum 1724 separating the first engine inlet 1710 from the second engine inlet 1730 lies in a plane 1726 that is not parallel to a center plane 1752 of the waverider wing 1700 in which a septum 1754 separating center engine inlets 1730 and 1750 lies. Similarly, a septum 1772 separating engine inlets 1750 and 1770 lies in a plane 1774 that intersects both the plane 1726 and the center plane 1752. Septums such as the septum 1724 may or may not be in a plane parallel to the center plane 1726 depending on the relative elevation of the inlet vertices.

Figure 18:
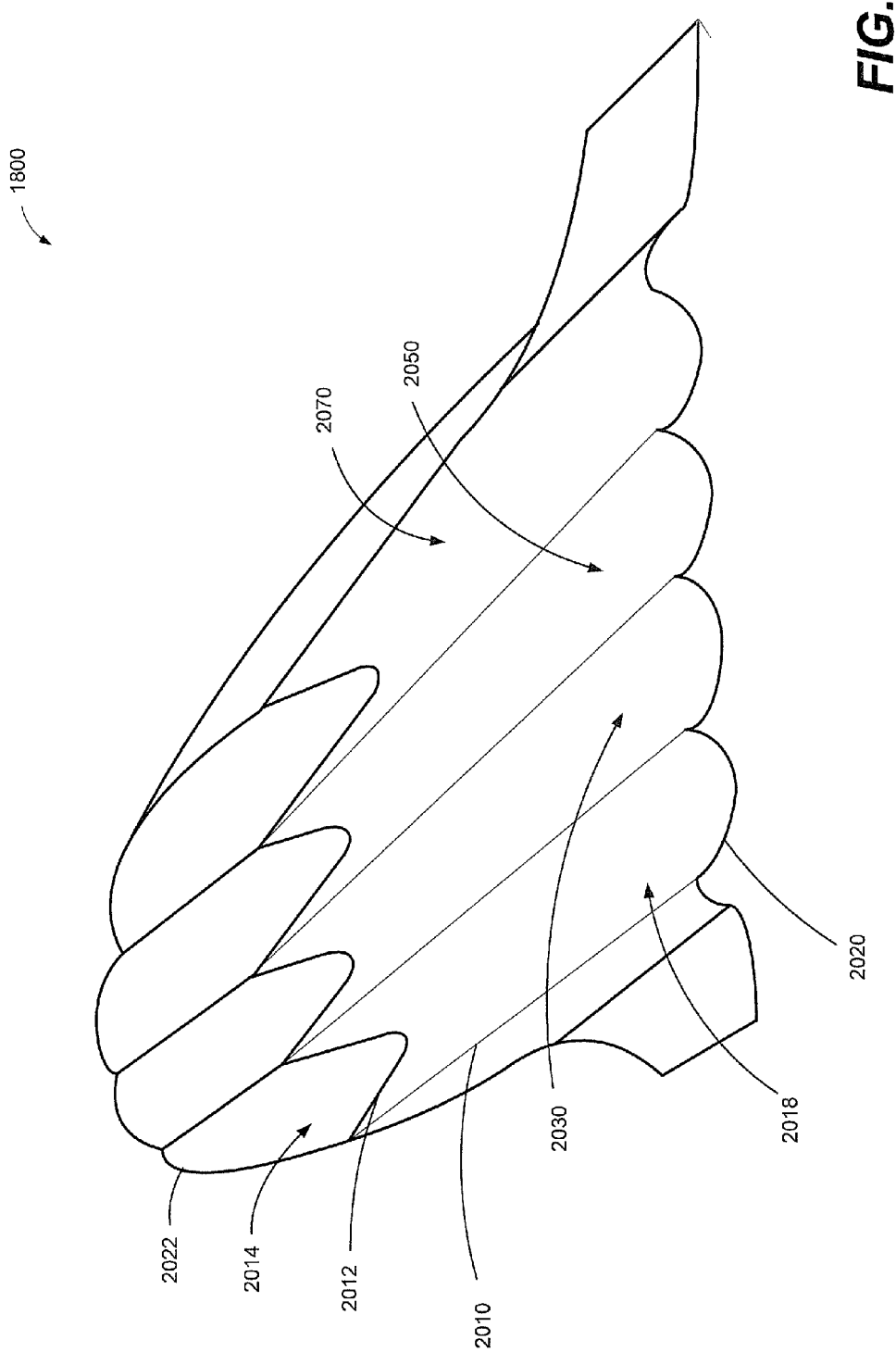
FIG. 18 is an oblique bottom perspective bottom view of the waverider wing of FIG. 17.
Figure 20:
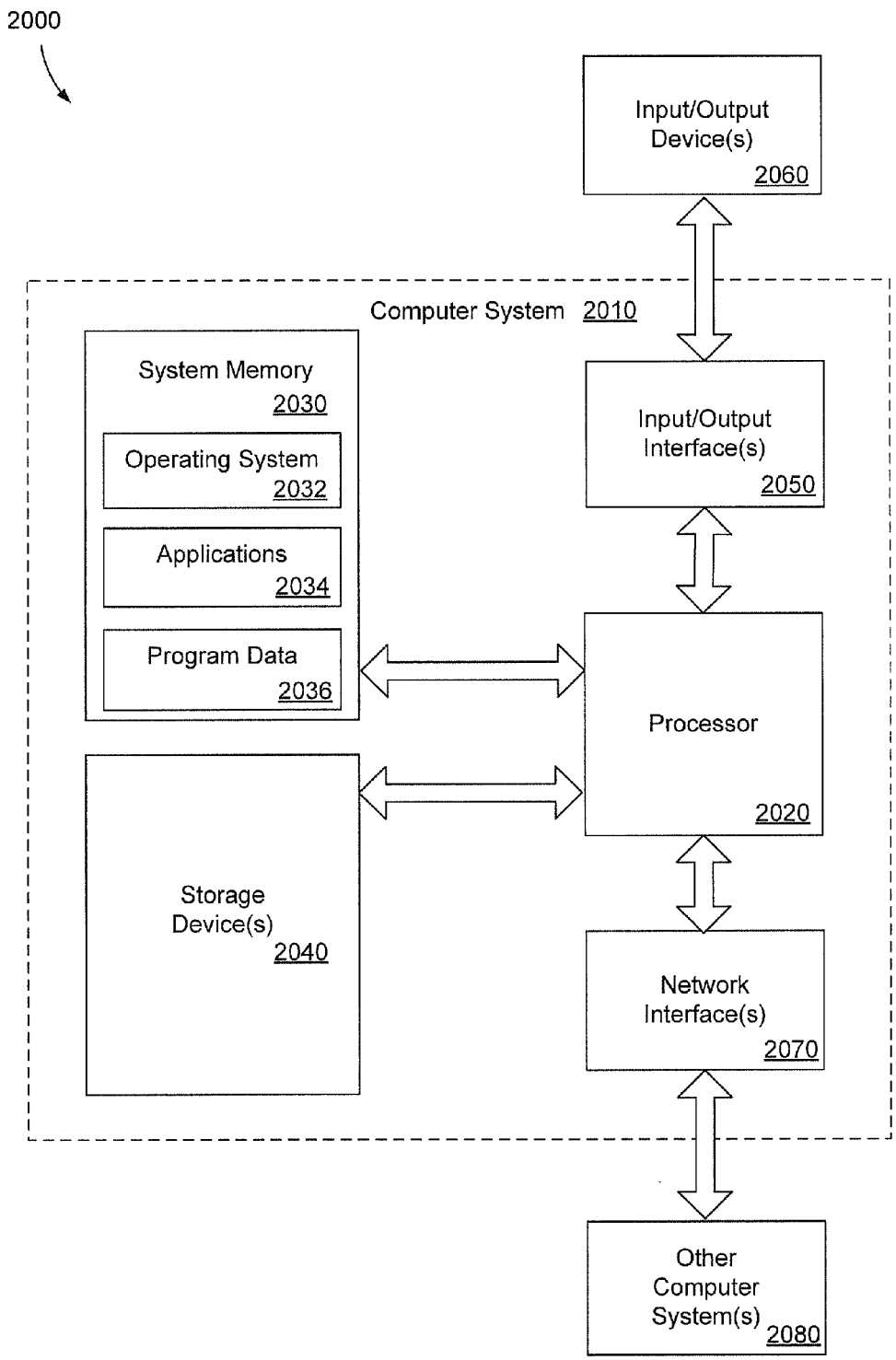
FIG. 20 is a block diagram of a general purpose computer system operable to implement embodiments of computer-implemented methods and computer-executable program instructions according to an embodiment of integrated hypersonic inlet design.

FIG. 18 is an oblique bottom perspective bottom view of the waverider wing 2000 of FIG. 20. The waverider wing 2000 includes a plurality of integrated engine inlets 2010, 2030, 2050, 2070. For example, the engine inlet 2010 may have a lower surface 2018 that extends from the leading edge 2012 of the engine inlet to the trailing edge 2020. A shape of the lower surface 2018 of an engine nacelle bounding the outer surface of the engine inlet 2010 may be defined by streamline tracing from the leading edge 2012 to the trailing edge 2020 of the waverider wing 2000. The engine inlet 2010 has an inner inlet surface 2014 that may be formed by streamline tracing from the leading edges 2012 and 2022 to an intake of an engine (not shown in FIG. 18). The engine inlet 2010 has an upper edge 2022 formed by projecting a wing leading edge onto an inlet shockwave (not shown in FIG. 18).

Figure 19:
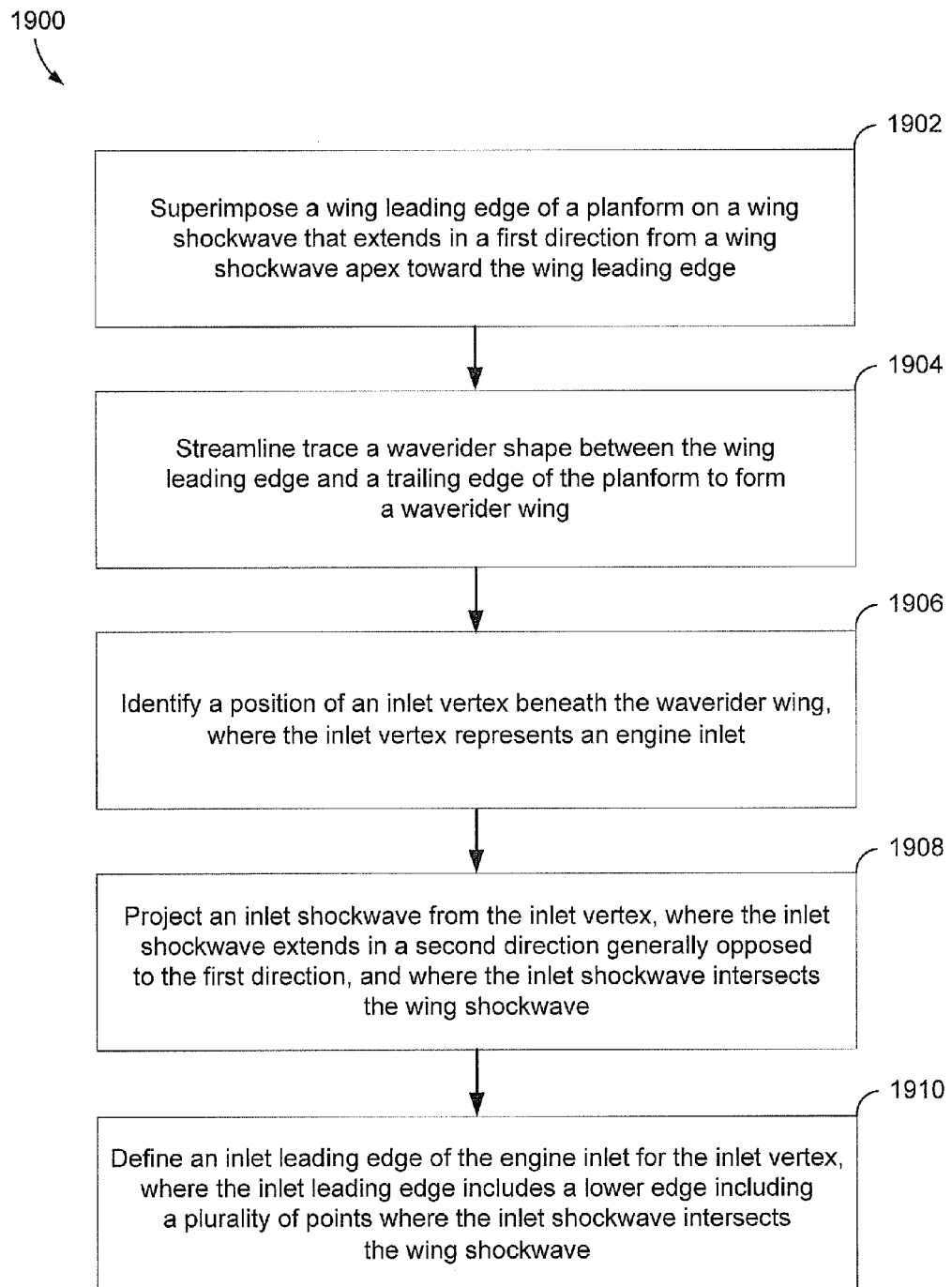
FIG. 19 is a flow diagram of a particular illustrative embodiment of a method of designing integrated hypersonic engine inlets on a hypersonic wing.

FIG. 19 is a flow diagram of an embodiment of a method 1900 of designing integrated hypersonic inlets on a hypersonic wing. A wing leading edge of a planform is superimposed on a wing shockwave, at 1902. The wing shockwave may be a generating, outward-turning shockwave that extends in a first direction from a wing shockwave apex toward the wing leading edge. A waverider shape is streamline traced between the wing leading edge and a trailing edge of the planform to form a waverider wing, at 1904. A position of an inlet vertex relative to the waverider wing is identified, at 1906. The inlet vertex corresponds with an engine inlet. An inlet shockwave may be projected from the inlet vertex, at 1908. The inlet shockwave may be an inward-turning shockwave that extends in a second direction generally opposed to the first direction. The inlet shockwave may intersect the wing shockwave. An inlet leading edge of the engine inlet is defined for the inlet vertex, at 1910. The inlet leading edge includes a lower edge including a plurality of points where the inlet shockwave intersects the wing shockwave.

FIG. 20 is a block diagram of a general purpose computer system operable to implement embodiments of computer-implemented methods and computer-executable instructions to design integrated inlets for a waverider wing as described with reference to FIGS. 1-21. The computing device 2010 typically includes at least one processor 2020. Within the computing device 2010, the processor 2020 communicates with a system memory 2030, one or more storage devices 2040, one or more input/output devices 2060, and one or more network interfaces 2070 through which the computing device communicates with one or more other computer systems 2080.

The system memory 2030 may include volatile memory devices, such as random access memory (RAM) devices and nonvolatile memory devices such as read-only memory (ROM), programmable read-only memory, and flash memory. The system memory 2030 typically includes an operating system 2032, which may include a basic/input output system for booting the computing device 2010 as well as a full operating system to enable the computing device 2010 to interact with users, other programs, and other computer systems 2080. The system memory 2030 also typically includes one or more application programs 2034, such as programs to design integrated engine inlets in a waverider wing of a hypersonic aircraft. The system memory 2030 also may include program data 2036, such as data describing operational parameters of the hypersonic aircraft, the engines to be used in the hypersonic aircraft, and other design information.

The processor 2020 also communicates with one or more storage devices 2040. The storage devices 2040 may include removable, nonvolatile storage devices such as magnetic disks, optical disks, or flash memory devices. The storage devices 2040 also may include nonremovable storage devices that typically include one or more of magnetic disks and nonvolatile memory.

The processor 2020 communicates via one or more input/output interfaces 2050 with the one or more input/output devices 2060 that enable the computing device 2010 to interact with a user. The input/output devices 2060 may include keyboards, pointing devices, microphones, speakers, and displays. The processor 2020 also communicates with one or more network interfaces 2070 that enable the computing device 2010 to communicate with other systems used in the design of a hypersonic aircraft.

Not all of the components or devices illustrated in FIG. 20 or otherwise described in the previous paragraphs are necessary to support implementations of the present disclosure. For example, a device may include an integrated system memory and storage device including a flash memory configured to store all programs and data for operation of a system. In addition, if all input and output is communicated via the network interfaces 2070, a system may not include any other input/output interfaces 2050 or the input/output devices 2060.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than is shown in the figures or one or more method steps may be omitted. Accordingly, the disclosure and the figures are to be regarded as illustrative rather than restrictive.

Moreover, although specific embodiments have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, the claimed subject matter may be directed to less than all of the features of any of the disclosed embodiments.

What is claimed is:

1. A method, comprising:
   projecting a wing leading edge of a planform on a wing shockwave that extends in a first direction from a wing shockwave apex toward the wing leading edge;
   streamline tracing a waverider shape between the wing leading edge and a trailing edge of the planform to form a waverider wing;
   identifying a position of an inlet vertex relative to the waverider wing, wherein the inlet vertex corresponds to an engine inlet;
   projecting an inlet shockwave from the inlet vertex, wherein the inlet shockwave extends in a second direction generally opposed to the first direction, and wherein the inlet shockwave intersects the wing shockwave; and
   defining an inlet leading edge of the engine inlet for the inlet vertex, wherein the inlet leading edge includes a lower leading edge including a plurality of points where the inlet shockwave intersects the wing shockwave.

2. The method of claim 1, further comprising defining a septum, wherein the septum is defined by an intersection of the inlet shockwave and a second inlet shockwave projected from an adjacent inlet vertex.

3. The method of claim 1, wherein defining the inlet leading edge includes defining an upper leading edge, wherein the upper leading edge is formed by projecting the wing leading edge of the planform onto the inlet shockwave.

4. The method of claim 1, further comprising repositioning the inlet vertex to adjust the shape of the engine inlet associated with the inlet vertex.

5. The method of claim 1, wherein the wing shockwave is determined by at least one of a projected altitude of operation and a projected speed of operation.

6. The method of claim 1, wherein the inlet shockwave is determined by one or more operational characteristics of an engine to be associated with the inlet vertex.

7. The method of claim 6, further comprising forming an inner surface of the engine inlet by streamline tracing from the inlet leading edge through an inlet flow field created by the inlet shockwave toward an intake of the engine.

8. The method of claim 1, further comprising streamline tracing a lower shape of an engine nacelle from the inlet leading edge through a flow field created by the wing shockwave toward the trailing edge of the planform.

9. The method of claim 1, wherein the wing shockwave includes a conical shockwave.

10. The method of claim 1, further comprising repositioning the inlet vertex relative to the waverider wing and automatically regenerating the inlet leading edge based on a change in the plurality of points at which the inlet shockwave intersects the wing shockwave.

11. An aircraft for hypersonic flight comprising:
    a waverider wing, wherein the waverider wing includes a wing leading edge traced on a wing shockwave that extends in a first direction from a wing shockwave apex toward the wing leading edge;
    one or more engines, wherein each of the one or more engines has an inlet shockwave vertex; and
    one or more engine inlets integrated with the waverider wing, wherein each of the one or more engine inlets has a leading edge configured to ride on the wing shockwave, each of the one or more engine inlets determined by:
    projecting an inlet shockwave from a particular inlet shockwave vertex, wherein the inlet shockwave extends in a second direction generally opposed to the first direction; and
    defining a lower portion of the leading edge at a plurality of points where the inlet shockwave intersects the wing shockwave.

12. The aircraft of claim 11, further comprising one or more engine nacelles, wherein each of the one or more engine nacelles is formed by streamline tracing an outer surface of each of the one or more engines from the leading edge of the engine inlet.

13. The aircraft of claim 11, wherein at least one of the one or more engine inlets further includes a septum defined by an intersection of the inlet shockwave and a second inlet shockwave projected from an adjacent inlet shockwave vertex.

14. The aircraft of claim 11, further comprising an inlet aperture associated with the particular inlet shockwave vertex, wherein a shape of the inlet aperture is determined based on a position of the particular inlet shockwave vertex relative to a surface of the waverider wing.

15. The aircraft of claim 14, wherein an upper portion of an engine inlet surface associated with the inlet aperture is formed by:
    projecting the planform shape of the waverider wing on an upper portion of the inlet shockwave to form an upper leading edge; and
    streamline tracing the upper portion inner shape from the upper leading edge through the inlet flow field toward the inlet shockwave vertex.

16. The aircraft of claim 11, wherein a lower portion of an engine inlet surface is formed by streamline tracing from the lower portion of the leading edge toward the inlet shockwave vertex.

17. The aircraft of claim 11, wherein a lower surface of a particular engine nacelle is formed by streamline tracing a lower shape of the particular engine nacelle from the first inlet leading edge through the wing shockwave toward the trailing edge of the planform.

18. A computer-readable storage medium storing instructions executable on a computing system to generate a waverider wing with integrated engine inlets, comprising instructions to:

determine a wing shockwave based on at least one of an anticipated velocity, an altitude, and a weight of an aircraft having a waverider wing configured to ride the wing shockwave;

project a wing leading edge of a selected planform onto the wing shockwave;

position an inlet vertex to correspond to a position of an intake of an engine relative to a surface of the waverider wing;

project an inlet shockwave onto the wing shockwave;

define a lower portion of a leading edge of an engine inlet at a plurality of points where the inlet shockwave intersects the wing shockwave; and define an upper portion of the leading edge of the engine inlet by projecting the wing leading edge onto the inlet shockwave.

19. The computer-readable storage medium of claim 18, further comprising instructions to define an inner surface of an engine inlet by projecting streamline traces from the leading edge of the engine inlet toward the inlet vertex.

20. The computer-readable storage medium of claim 18, further comprising instructions to define an outer surface of an engine nacelle associated with the engine inlet by projecting streamline traces from the leading edge of the engine inlet toward a rear of the waverider wing.

* * * * *